Nov. 13, 1962 H. H. GATES 3,063,156
THREE-POINT STABILIZED GAGE
Filed April 27, 1959 2 Sheets-Sheet 1
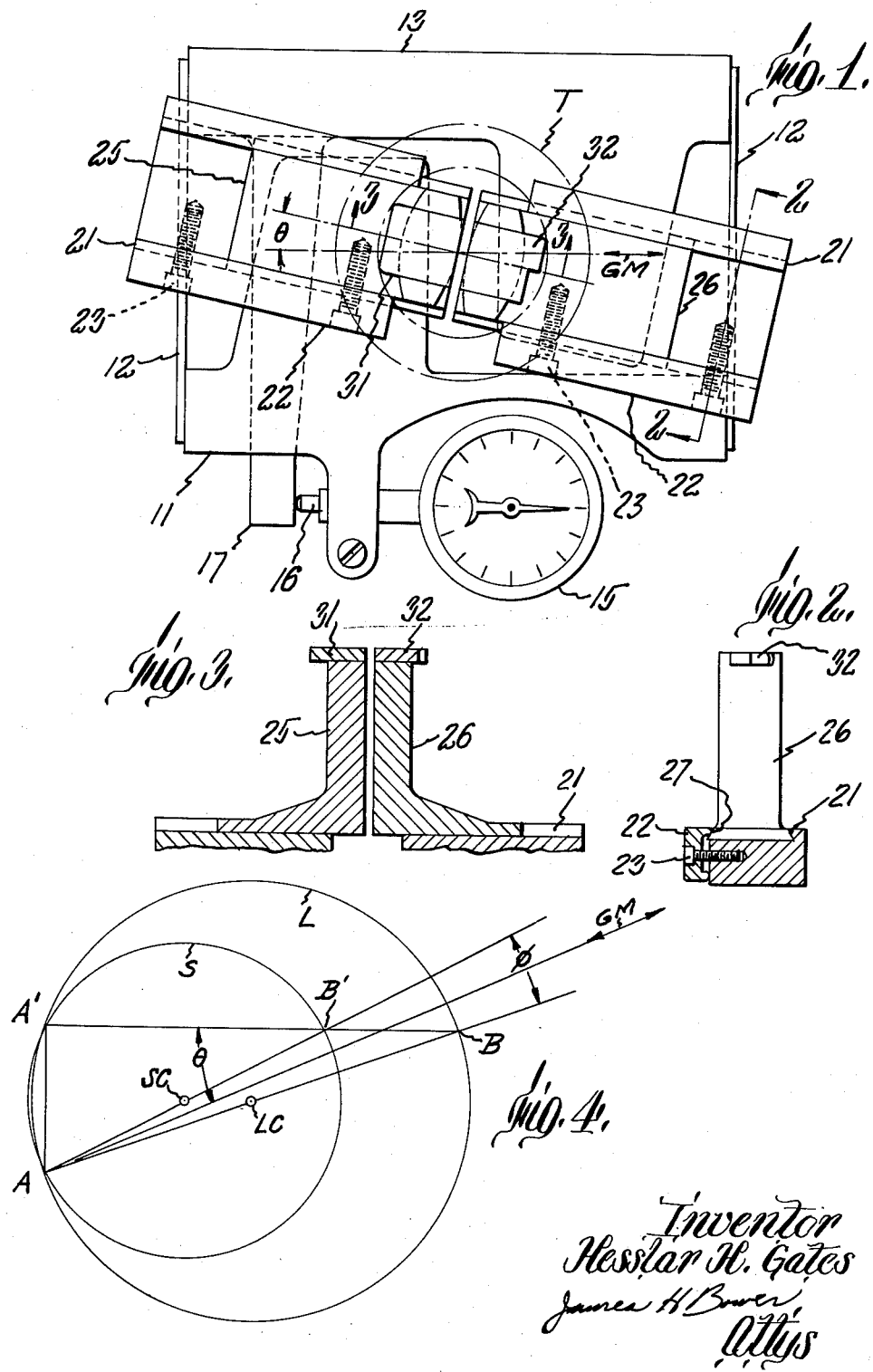
Inventor
Hesslar H. Gates

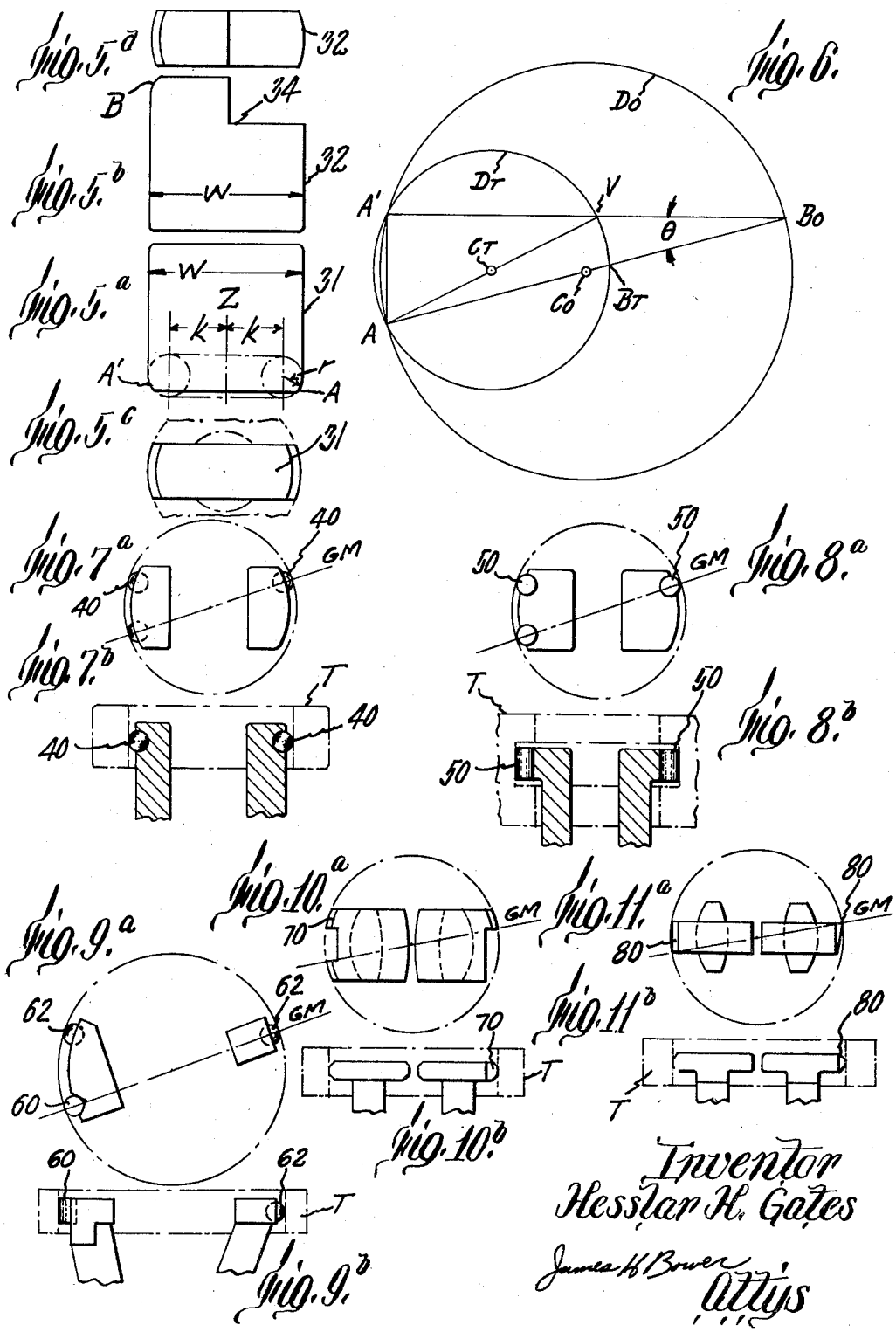

United States Patent Office 3,063,156
Patented Nov. 13, 1962

3,063,156
THREE-POINT STABILIZED GAGE
Hesslar H. Gates, Charlestown, N.H., assignor, by mesne assignments, to Ex-Cell-O Corporation, Detroit, Mich., a corporation of Michigan
Filed Apr. 27, 1959, Ser. No. 808,999
9 Claims. (Cl. 33—178)

This invention relates to improvements in gaging devices, and particularly to a novel organization of the effective gaging points of such devices when used for cylindrical measurement.

Internal gages may be grouped into at least two general types, gages which contact the workpiece at two points, and gages which contact a workpiece at three points. Gaging and internal diameter of a cylinder by a direct measurement between two points involves lesser complications and is a straightforward method, as compared with three-point gaging. In known three-point gaging devices, a ratio system to compensate for the cosine effect and/or non-standard dial equipment must be used. However, three-point gages have a favorable feature of being more stable and they largely eliminate the necessity of seeking and probing in more than one direction to line up the axis of the effective gaging points. On the other hand, the gage stabilizing means known heretofore either in form of an (1) auxiliary third point, or (2) independent yieldable means, have not been satisfactory, as they demand extra and often complicated mechanism. In the first case the auxiliary third point requires a time consuming and touchy separate adjustment, while in the second case the space requirements compel the use of a frail and supersensitive mechanism.

It is therefore an object of this invention to provide a three-point gage incorporating the favorable features of a two-point gage without the normally inherent shortcomings thereof.

A further object of this invention is to provide a gage with an auxiliary point which is fixed in relationship to one of the two effective gaging points.

Another object of this invention is to provide a gage wherein the effective gaging points and the auxiliary point are organized in a manner such that the positioning of the auxiliary point is an automatic function adjunct to the adjustment of the effective gaging points.

Still another object of this invention is to provide a gage which may be used over a reasonable and practical range of measurement with only a comparatively simple adjustment.

An additional object of this invention is to provide a gage which is simple and economical to manufacture, and is rugged and time saving in use.

Other objects and advantages will be apparent from the following detailed description taken in connection with the accompanying drawings, wherein:

FIG. 1 is a top plan view of a contractible gage adapted to the present invention.

FIG. 2 is a sectional elevation view taken along line 2—2 of FIG. 1.

FIG. 3 is a fragmental sectional elevational view taken along line 3—3 of FIG. 1.

FIG. 4, is diagrammatic showing of the geometric organization of the effective gage points and their effect over the range of adjustment.

FIGS. 5a to 5d inclusive illustrate in enlarged scale the gage segment shown in FIGS. 1, 2 and 3; FIGS. 5a and 5b are top plan views while FIGS. 5c and 5d are end elevation views.

FIG. 6 is a diagrammatic view similar to FIG. 4 illustrating the relative position of the effective gaging points when measuring over a normal tolerance spread.

FIGS. 7a and 7b illustrate in plan and elevation a variation in shape of the gage point containing elements.

FIGS. 8a and 8b illustrate in plan and elevation a modification of the gage point containing elements.

FIGS. 9a and 9b illustrate in plan and elevation another modification of the gage point containing elements.

FIGS. 10a and 10b illustrate in plan and elevation still another modification of the gage point containing elements.

FIGS. 11a and 11b illustrate in plan and elevation a further modification of the gage point containing elements.

The present invention may be adapted to any basic type of contractible internal gaging device, and the embodiments are described in combination with a specific type of gage described in U.S. Patents Nos. 2,588,820 to Gates et al., and 2,821,783 to Cargill et al. In my patent application Serial No. 609,028, filed September 10, 1956, which issued into Letters Patent No. 2,854,759, on October 7, 1958, there is disclosed and described a three-point thread gage having a geometrical organization different from the present invention.

Referring to FIG. 1, the gage structure includes two relatively movable anvil supporting members 11 and 13. Member 11 is a portion of a base and member 13 is supported thereon by yieldable reed means 12—12 having one degree of freedom permitting a relative linear movement between the members. The direction of this movement is indicated by a double arrow GM and constitutes the gage movement. To member 11 is secured a dial indicator 15 with an actuating stem 16 which may be engaged by an arm 17 of member 13 to indicate relative movement of the supporting members and thus measure the diameter of a test piece T positioned about the gage anvils.

The supporting members 11 and 13 are provided with dovetail slides 21—21 to adjustably support gage anvils 25 and 26 respectively. In adjusted position the anvils are locked with gibs 22 attached to members 11 and 13 by screws 23. These gibs 22 supply a pinching force acting on foot portions 27—27 of the gage anvils provided with dovetail configurations matching slides 21—21. These dovetail slides are angularly displaced at an angle $\theta$ relative the line of gage movement GM. To the head portion of the anvil 25 is permanently affixed a segment 31 provided with two spaced gage points and likewise a segment 32 is secured to head portion of anvil 26 but this segment has only one gage point arranged in a manner to be described in detail below. With gage points in contact with the test piece T the gage anvil is adjusted to a preferably central position along the dovetail slide as shown in FIGS. 1 and 3.

A purpose of the adjustability of the gage anvils along the dovetail slide is to make the gage usable inside a reasonable and practical range wherein a single set of gage segments suffice to cover the range. The principles making this possible will now be described with reference to FIG. 4. Assuming that the angle $\theta$ is chosen to be 12°, which has been found suitable for gaging holes at least up to 5″, the circle L with center $L_c$ represents the largest hole in a range and circle S with center $S_c$ represents the smallest hole in the range. The two gage points of the segment 31 are represented by A and A′ respectively, and the single gage point of segment 32 by B in contacting position on circle L.

The line A—A′ forms a chord and a side in a right triangle inscribed in the circle L where the hypotenuse is the circle's diameter, and therefore the distance between points A and B corresponds to the measurement of a test piece in contact with these points. The relative linear gage movement between contacts A and B should then theoretically and correctly be along the line A—B and the angle opposite the chord should equal $\theta$. However, it is postulated that the gage should have a usable range, i.e. it should be capable of correctly measuring any dimension between those represented by circles L and S, and it is clear that, when the gage anvils are adjusted (in the dovetail slide) parallel to line A'—B, the point B having a locus on said line, has moved to a position B' and the opposite angle is no longer equal to $\theta$. Therefore a compromise may be accepted in choosing the movement GM to be along a line with the angle $\theta$ to line A'—B and in equal part dividing the angle $\phi$ between the hypotenuses of the triangles inscribed in circles L and S respectively. This is an acceptable compromise so long as $$\frac{\phi}{2}$$

is not greater than 5° because a change of .001″ in the hypotenuses A—B or A—B' respectively will be correctly indicated within .000004″. From this it follows that the chord A—A' which also is a common side of said triangles should have a length resulting in a value of the angle opposite being $$\theta - \frac{\phi}{2}$$

for circle L and $$\theta + \frac{\phi}{2}$$

for circle S.

In FIGS. 5a to 5d inclusive are shown enlarged views of the segments 31 and 32. These segments may be manufactured from flat stock preferably of hard material e.g. tungsten carbide. The gaging end portions of the segments may be formed as sections of cylinders as shown in FIGS. 5c and 5d to blend with curvatures at the extremes of the segment, FIGS. 5a and 5b being portions of a torus containing the said contacting points, i.e. segment 31 provides the two points A and A', and segment 32, having a portion 34 removed from its end, provides a single point B. Said torus is generated about the center line Z of segments 31 and 32 having a radius of half W; W is the width of segments 31 and 32. The radius half W equals K plus R; K is the distance from Z to the center for the external radius R of the torus. The thickness of the segments 31 and 32 in combination with the torus determines the contacts A, A' and B. The dimensions of W, R and K of the segments are chosen to space the contact points in a manner to correspond and to fulfill the requirements of the length of the chord A—A' for a desired range as explained in connection with FIG. 4. Other shapes of the segments are possible as long as a torus portion or any equivalent form may be generated thereon to contain the actual gaging points.

FIG. 6 may be referred to for a specific example, namely the measurement of a hole having 1″ diameter with a desired tolerance spread from +1.000″ to −0.990″. A circle $D_0$ having a center $C_0$ represents the basic or plus dimension, and a circle $D_T$ with center $C_T$ the minus dimension. A suitable master, which may be either a known diameter cylinder or a master having two parallel planes separated by a known amount, is placed on the gage. In this case the known size dimension should properly be a close approximation of 1.000″. The gage anvils are now adjusted along the dovetail slide to establish contact between the master and points A, A' and B locating the point B in position $B_0$ on circle D. For practical reasons explained in connection with FIG. 4 the line of gage movement GM can be considered to be along line A—$B_0$. In attempting to measure the diametrical dimension of circle $D_T$ it will be clear from the inherent geometry of the system that the contact B will move from position $B_0$ to a position $B_T$. This would constitute an indicating error corresponding to the functional effect of the distance between V and $B_T$. However, with the relative arrangement of the elements of the gage in the present invention this error is of no practical importance: In this example where a tolerance spread of 0.010″ is to be checked the effect of the distance V to $B_T$ can be calculated and it amounts to an indicated diametrical error of 0.000002″ or only a fraction of the gage maker's tolerance as established by the industry.

While gaging segments provided with torus shaped portions described above are preferred, other forms may be effectively employed, and in FIGURES 7a and 7b the points are contained in portions of spheres 40, with the prerequisite that in using the gage, one must seek a position where the plane in which the centers of the spheres are located is normal to the axis of the hole measured, since any mislocation from this position would result in a false indicator reading.

FIGS. 8a and 8b illustrate another variation where three cylinder portions 50 contain the gaging points or lines. In this modification, there is the prerequisite that the axes of these cylinders be mutually parallel and in use also parallel to the axis of the hole measured. This variation, although containing certain limitations has its place in specific cases, of which one is shown in FIG. 8b, where it is used to measure the diameter of a circular groove inside a cylindrical bore, and following the normal practice of making the thickness of the segment nearly equal to the minimum groove width, the length of the cylinders is accordingly made in such manner.

FIGS. 9a and 9b show a modification wherein the gage points are contained in one cylindrical portion 60 and two spherical portions 62. Thus this modification is a combination of the gage points shown in FIGS. 7 and 8.

FIGS. 10a and 10b show another variation in the construction of the gage points wherein the gage points 70 have sharp corners facing the line of gage movement. The sharp corner construction is less expensive to machine and easier to assemble.

FIGS. 11a and 11b illustrate a further variation in the construction of the gage points 80. In this variation the gage points have sharp corners facing away from the line of gage movement.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A measuring gage set by a master to measure bores within a predetermined dimensional range, said gage comprising: one gage anvil having a first measuring gage contact and a stabilizing gage contact thereon, said gage contacts being adapted to engage the periphery of a bore, another gage anvil having a second measuring gage contact thereon adapted to engage the periphery of said bore within said predetermined range diametrically opposite said first measuring gage contact, and mounting means for said gage anvils so relative movement will be along a line extending through the center of the diameter of said master and extending through the said first and second measuring gage contacts.

2. A gage as defined in claim 1 wherein said gage contacts are segments of cylinders formed in the gage elements; said segments being formed within a torus.

3. A gage as defined in claim 1 wherein said gage contacts are portions of spheres attached to said gage elements and the plane defined by the centers of the spheres is perpendicular to the axis of the test piece.

4. A gage as defined in claim 1 wherein said gage contacts are portions of cylinders attached to said gage elements and the axes of these cylinders are parallel to each other and to the axis of the test piece.

5. A gage as defined in claim 1 wherein at least one of said gage contacts is a portion of a sphere and the other of said gage contacts are portions of cylinders, all of said gage contacts being attached to said gage elements.

6. A gage as defined in claim 1 wherein said gage contacts are formed as sharp edges in said gage elements.

7. A gage for measuring a bore between predetermined tolerance limits, said gage comprising: a pair of gage anvils mounted for relative movement with respect to each other, a pair of spaced gage contacts on one of said gage anvils adapted to engage the periphery of said bore, a single gage contact on the other of said gage anvils adapted to engage the periphery of said bore diametrically opposite one of said pair of gage contacts, said single gage contact forming a line relationship with respect to the other of said pair of gage contacts which is perpendicular to a line formed between the pair of gage contacts when the bore is of the desired diameter, and said relative movement of the gage anvils is such that the single gage contact will move in a straight line path with respect to said gage contact diametrically opposite.

8. A gage comprising a pair of gage anvils mounted for relative movement toward and away from one another, one of said anvils providing a pair of angularly spaced gage contacts for engagement with two spaced portions on the periphery of a bore to be measured and the other of said anvils providing a single gage contact for engagement with a single position on the periphery diametrically opposite one of said spaced gage contacts, said pair of angularly spaced gage contacts comprising one stabilizing gage contact and the other is a first measuring gage contact, said single gage contact being a second measuring gage contact, the relative directions of movement of said anvils are such that said first and second measuring gage contacts move toward and away from each other along a straight line, and a line from said second measuring gage contact and said stabilizing contact being substantially perpendicular to a line running through the first measuring gage contact and stabilizing gage contact.

9. A contractible internal measuring gage having first and second gaging anvils, each having gaging contacts arranged for relative movement along a line which is a diameter of a circular curvature of gaging contacts of said anvils, said contacts disposed on opposite sides of a perpendicular to said diameter through the center of said curvature, said diameter and said perpendicular forming imaginary quadrants, a single gaging portion of the first anvil to engage in a bore on the boundary between the first and fourth quadrant, the second anvil having two angularly spaced gaging contacts, one of said contacts to engage in said bore in the second quadrant, and the other contact to engage in said bore in the boundary between the second and third quadrant.

References Cited in the file of this patent

UNITED STATES PATENTS

| | | |
|---|---|---|
| 2,588,820 | Gates et al. | Mar. 11, 1952 |
| 2,591,452 | Maag | Apr. 1, 1952 |
| 2,821,783 | Cargill et al. | Feb. 4, 1958 |
| 2,854,759 | Gates | Oct. 7, 1958 |
| 2,879,601 | Canfield | Mar. 31, 1959 |